Oct. 13, 1953  J. T. WEBBER  2,655,034
SPECIFIC-GRAVITY TESTER
Filed Dec. 3, 1947  2 Sheets-Sheet 1
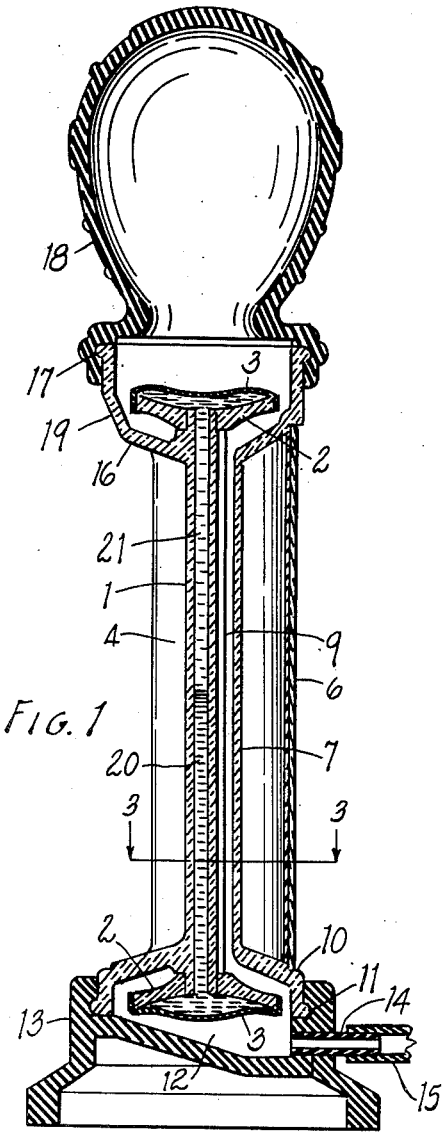
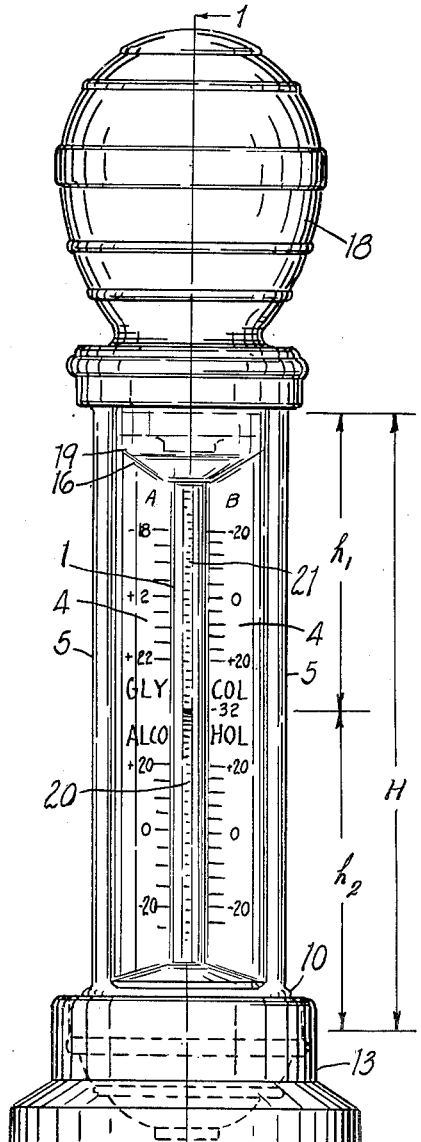
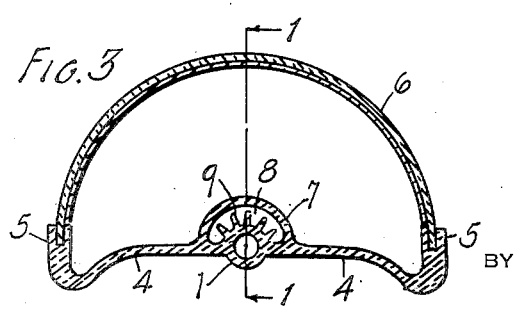
INVENTOR.
Joseph T. Webber
ATTORNEY Oct. 13, 1953          J. T. WEBBER          2,655,034
SPECIFIC-GRAVITY TESTER
Filed Dec. 3, 1947          2 Sheets-Sheet 2

INVENTOR.
Joseph T. Webber
BY
Otto A Earl
Attorney.

Patented Oct. 13, 1953

2,655,034

UNITED STATES PATENT OFFICE 2,655,034

SPECIFIC-GRAVITY TESTER

Joseph T. Webber, Galesburg, Mich.

Application December 3, 1947, Serial No. 789,445

22 Claims. (Cl. 73—32)

This invention relates to improvements in a specific gravity tester.

The principal objects of this invention are:

First, to provide an instrument for testing the specific gravity of fluids in which the range of movement of the indicator is increased for a given length of scale or in which the total length of the scale may be reduced for measuring a given range of specific gravities.

Second, to provide a specific gravity tester arranged to measure a wide range of specific gravities with a minimum of scale length.

Third, to provide an instrument for measuring specific gravities which automatically compensates for various temperatures of the fluid being tested and may be read in terms corrected to a predetermined standard temperature.

Fourth, to provide an instrument which may be calibrated in terms of a characteristic of the specific gravity of a fluid, such as the freezing point, to give direct readings in terms of the characteristic automatically compensated for temperature variations of the liquid.

Fifth, to provide a device for measuring the specific gravity of liquids, or characteristics of the liquids dependent upon the specific gravity, which may be manufactured in a convenient, portable form or for a permanent installation located remotely from a tank of the liquid to be tested.

Sixth, to provide a specific gravity tester which has no fragile or delicate parts which are liable to be broken.

Seventh, to provide a gage for measuring the specific gravity of a liquid or any characteristic of the liquid dependent upon its specific gravity which may be observed directly without looking through an intervening film of the liquid being tested.

Eighth, to provide an instrument for measuring specific gravity in which no correction is necessary for vapor pressure of the test liquid or instrument liquid.

Other objects and advantages pertaining to the details and economies of the invention will be apparent from a consideration of the following description and claims.

The drawings, of which there are two sheets, illustrate a preferred portable form of my instrument and two adaptations of my instrument to permanent installations.

Fig. 1 is a vertical longitudinal cross-sectional view through a portable type of my tester, the section being taken along the line 1—1 in Figs. 2 and 3.

Fig. 2 is a front elevational view of the instrument shown in Fig. 1 and showing the scale calibrated in terms of the freezing point of the liquid being tested.

Fig. 3 is a transverse cross-sectional view along the line 3—3 in Fig. 1.

Figure 4:
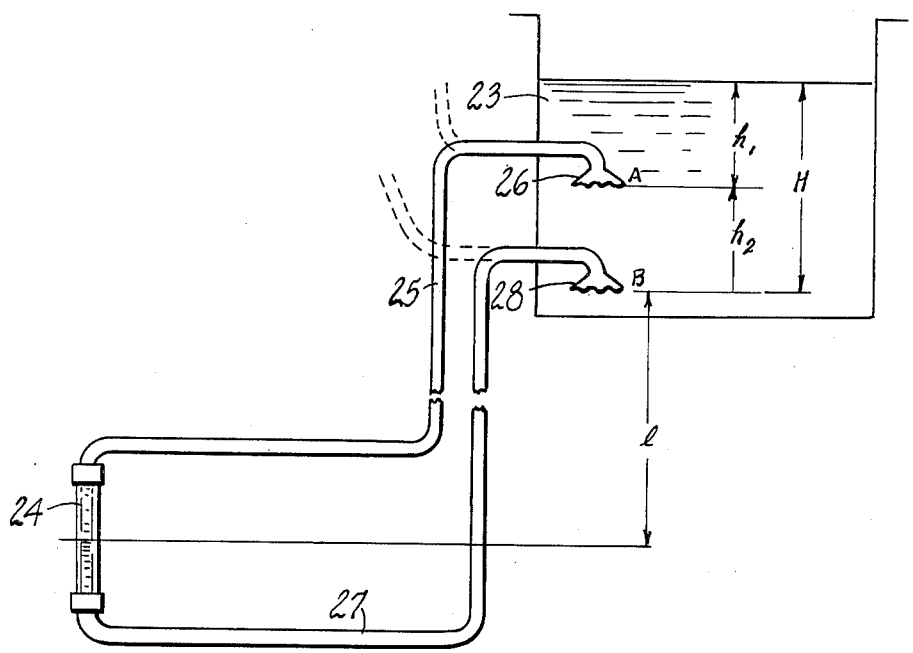
Fig. 4 is a fragmentary elevational view illustrating conventionally one manner of applying my instrument to a tank which may be located remotely from the instrument.

The method of testing the specific gravity of liquids by means of balancing the weight of a known column of the test liquid against a column of a liquid in the instrument is well known and it has previously been proposed to enclose the instrument liquid within a graduated sight column provided with enlarged pockets and flexible diaphragms at each end thereof. In this latter form of instrument, the liquid to be tested is admitted around the sight tube and both diaphragms so that the pressure of the test liquid causes the instrument liquid to rise in the sight tube proportionally to the density to the test liquid. These prior instruments have employed a single test fluid which must necessarily be heavier than the liquid to be tested in order to obtain a reading on the scale of the instrument and further have been relatively long since the variation of level of the instrument liquid is directly proportional to the density of the liquid being tested.

It is my present invention to provide an instrument for testing specific gravity in which two non-miscible liquids of different densities are enclosed in a graduated sight tube having enlarged bells on each end closed by impermeable flexible diaphragms. The entire space within the sight tube and end bells is filled with the two liquids and there are no air pockets to become filled with vapor of the liquids.

In the example of my instrument illustrated in Figs. 1 to 3, I have provided a sight tube 1 of glass or transparent plastic, the ends of which are arranged to receive the enlarged bell members 2 covered or closed by the impermeable flexible diaphragms 3. The sides of the sight tube 1 are formed with laterally extending ribs 4 which are flanged rearwardly as at 5 and connected to a semi-cylindrical shell 6 which is preferably made of laminated transparent material such as plastic. An interior semi-cylindrical wall 7 is spaced from the rear side of the sight tube and connected at its forward edges with the ribs 4 to form a test fluid passage 8 along the back side of the sight tube. The common wall between the passage 8 and the sight tube 1 is preferably formed with a series of heat exchange ribs 9.

The semi-cylindrical wall 7 terminates short of the ends of the sight tube 1 and is merged with cup-shaped extensions 10 enclosing the ends of the sight tube and the bell members 2. The lower extension 10 is flanged as at 11 to have a sealing snap fit within the recess 12 formed in a base 13. The base is preferably made of semi-hard rubber material to cushion the instrument and is provided with an inlet 14 communicating with the recess 12. The inlet 14 is conveniently attached to a rubber tube 15 through which the liquid to be tested may be sucked into the instrument.

The upper cupped end 16 is flanged as at 17 to have a snap fit within the rubber suction bulb 18 by means of which the fluid to be tested may be sucked into the instrument. Preferably the front of the upper cup 16 is flattened as at 19 to form a view window through which the level of the liquid being tested may be observed as the accuracy of my instrument depends upon both of the diaphragms 3 being submerged in a column of the test liquid.

The space within the sight tube 1 and the bell members 2 is filled with approximately equal amounts of a relatively heavy liquid indicated at 20 and a relatively light liquid indicated at 21. The liquids must be mutually immiscible and one or both are preferably dyed to render a junction clearly visible through the front of the sight tube. Another method of making the junction of the two instrument liquids is to employ a float which is lighter than the heavy liquid and heavier than the light liquid so as to always float at the junction.

As is most clearly illustrated in Fig. 2, the ribs 4 on each side of the sight tube may be graduated to indicate the specific gravity or a characteristic dependent on the specific gravity of the liquid being tested. The instrument shown in Fig. 2 is graduated to read directly the freezing point of solutions commonly found in automobile radiators. The dotted lines in Fig. 2 indicate an alternative method of applying a suction tip 22 to the bottom of the base 13.

Considering now the theory of operation of my device, it should be apparent that when a sufficient quantity of the fluid being tested is drawn into the instrument, the two diaphragms 3 will be subjected to a pressure differential equal to the head between the two diaphragms indicated at H in Fig. 2 multiplied by the density of the test liquid which may be referred to as D. The differential pressure due to the test liquid on the outside of the lower diaphragm 3 is therefore equal to HD and this is balanced on the inside by the pressure of the two columns of instrument fluid 20 and 21, one superimposed upon the other. Equating the exterior test fluid pressure against the interior instrument fluid pressure, we have $$HD = h_2 d_2 + h_1 d_1$$

where $h_2$ equals the depth of the heavy instrument fluid and $h_1$ equals the depth of the light instrument fluid and where $d_1$ and $d_2$ represent the densities of the corresponding instrument fluids. In the above equation, it will be noted that H is fixed by the spacing of the diaphragms and $d_1$ and $d_2$ are fixed by selection of instrument fluids. D may be fixed for calibrating purposes so that the scale on the sides of the instrument may be calibrated in terms of specific gravity or directly in terms of a characteristic of the specific gravity such as freezing point of the liquid being tested.

It is a well known fact that the specific gravity of a liquid varies considerably, depending upon the temperature of the liquid so that the specific gravity is not an accurate indication of the physical properties of the liquid, without being corrected for temperature. In my instrument, the specific gravity of the liquid being tested is balanced or measured against an instrument liquid which is also subject to similar changes in density so that variations of temperature in the test liquid will be compensated for by corresponding changes of density and temperature in the instrument liquids. In order to obtain rapid and effective equalization of the temperatures of the instrument liquids and testing liquid, I have provided the passage 8 and fins 9 for the transfer of heat between the liquids, and have further arranged for the incoming testing liquid to be drawn along the surface of the lower diaphragm 3 to obtain rapid heat transfer.

From the above description, it should be apparent that my instrument is well adapted for use as a direct reading specific gravity meter or as a direct reading freezing point tester. Naturally, various combinations of instrument liquids will be used, depending upon the range of specific gravity of the liquids to be tested. I have found that a satisfactory combination for a freeze point tester is to use a dyed water solution of ethylene glycol containing a small amount of water soluble wetting agent as the heavy liquid 20 in the instrument. The density of this heavy liquid is adjusted to 1.190 at 60° F. The lighter instrument liquid 21 is a silicone oil, dyed and having a density of .986 at 60° F. The expansion curve of the heavy liquid is practically identical with the expansion curve of the water and glycol solutions commonly used in automobile radiators and the expansion curve of the silicone oil is similar to the expansion curve of alcoholic solutions used in radiators.

Thus, when a test solution is drawn from a radiator into the instrument a high percentage of glycol in the solution will have a relatively high density and must therefore be balanced by a relatively long column of the heavy liquid 20 and a resultant short column of the light liquid 21. High concentrations of glycol naturally reduced freeze point of the solution so the scale is marked as shown in Fig. 2. If a solution of alcohol and water is drawn into the instrument, the specific gravity will be less than one and the junction between the two columns of instrument liquid will fall along the alcohol scale. The weight of the column of the solution will be balanced by a relatively long column of the light liquid 21 and a relatively short column of the heavy liquid 20. The greater the concentration of alcohol, the lower the freezing point of the solution and the scale will be marked as shown. Scales A and B may be provided on the instrument, reading directly for the various types of glycol and alcohol solutions commonly used in automobile radiators.

To use my instrument as a battery tester, I have found that the light instrument fluid may be the silicone oil referred to above and the heavier liquid may be a salt water solution of approximately 1.330 specific gravity.

It should be particularly noted that when my instrument is being used to test a relatively heavy solution such as a water glycol solution, the major portion of the column of liquid in the sight tube consists of the heavy glycol instrument fluid whose expansion characteristics closely resemble the expansion characteristics of the glycol solution. Conversely, when an alcohol solution is being tested the major portion of the sight column is filled with the light instrument fluid. Thus, the temperature correction of my instrument is extremely accurate and quite adequate for routine testing, such as checking automobile radiators.

Fig. 4 illustrates a manner of employing my instrument in a more or less permanent installation to measure the specific gravity of a fluid in a tank which may be located remotely from the sight tube. A tank of the liquid to be tested is indicated at 23 and the sight tube is indicated at 24. The upper end of the sight tube is connected by means of a pipe 25 to the downwardly facing bell and diaphragm 26 and the lower end of the sight tube is connected through the pipe 27 to the lower bell and diaphragm 28. The sight tube and pipes 25 and 27 are filled with two liquids of different densities as previously explained and selected to cover the range of density of the liquid in the tank 23. The upper and lower diaphragms are secured at a fixed and known distance apart at any suitable level below the surface of the liquid so as to be always covered with the liquid.

The pressure at the junction of the two liquids in the sight tube 24 due to the upper or light liquid is equal to $Ld_1 + h_2 d_1 + h_1 D$ where D is the density of the test liquid and $d_1$ is the density of the lighter instrument liquid. This pressure is balanced by the pressure in the heavy instrument liquid which is $Ld_2 + HD$. Equating these two pressures we have $$Ld_1 + h_2 d_1 + h_1 D = Ld_2 + HD$$

and solving for L we have $$L(d_1 - d_2) = HD - h_2 d_1 - h_1 D$$

or $$L = \frac{D(H - h_1) - h_2 d_1}{d_1 - d_2}$$

and since $H - h_1 = h_2$, this may be changed to $$L = \frac{Dh_2 - h_2 d_1}{d_1 - d_2}$$

or $$L = \frac{h_2(D - d_1)}{d_1 - d_2}$$

In this later equation $h_2$, $d_1$ and $d_2$ are fixed and D may be arbitrarily changed for computing and calibrating the scale on the sight tube 24. The equation may be written in terms of D in which case it is $$L(d_1 - d_2) + h_2 d_1 = HD - h_1 D_1$$

or $$D = \frac{l(d_1 - d_2) + h_2 d_1}{h_2}$$

In this form L is read from the scale and all other terms being fixed the equation may be solved for D or the scale may be read directly in terms of specific gravity.

Figure 5:
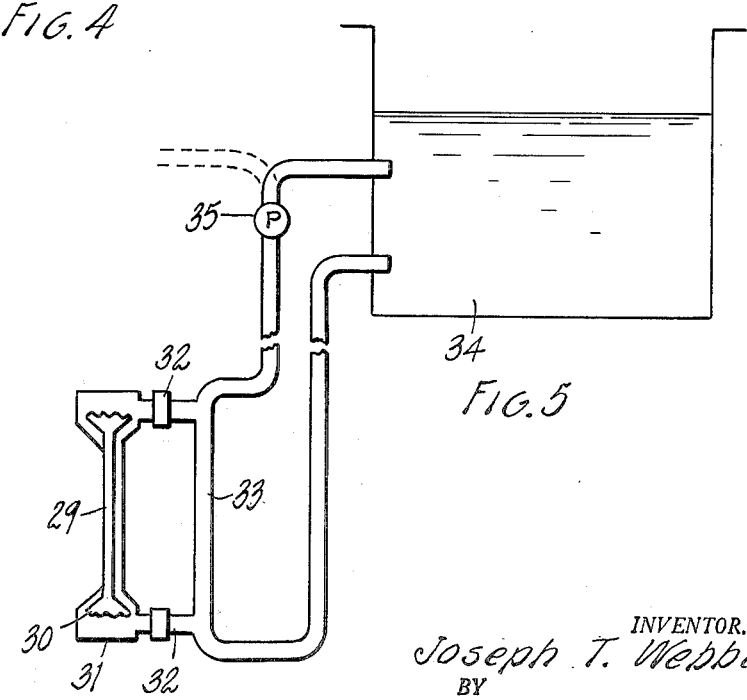
Fig. 5 is a fragmentary elevational view illustrating a second method of applying my instrument to a remotely located tank.

Fig. 5 illustrates a second form of permanent installation for my gage which includes the temperature compensating feature and may be located remotely from a tank of the fluid to be tested. Here the sight tube 29 and bells 30 are enclosed in a chamber 31 having access passages 32 at the top and bottom thereof to prevent the formation of air pockets. The passages 32 are connected to a pipe or conduit 33 carrying the fluid to be tested. The pipe 33 may be part of a precessing or transporting system for the fluid or may be merely a testing loop to the gage from a tank 34 as shown. A pump 35 may be provided for circulating the fluid. The gage 29 is calibrated and read in the same manner as the portable form of my gage shown in Figs. 1 to 3.

In all forms of my instrument described above, the description and computations have assumed diaphragms of infinite diameter so that the movement of the diaphragms has no effect on the length of column of liquid involved. It will be readily appreciated that in any particular form of my gage allowances must be made for movement of the diaphragms but if the diameter of the diaphragms is made relatively large compared to the diameter of the sight tubes these allowances may be reduced to a negligible minimum.

In all forms of my gage I have described the range of the instrument as being determined by the selection of light and heavy instrument liquids of proper density. This method of determining the instrument range is the most practical and will cover most applications of my gage. However, it is possible to vary the range of a gage embodying my two liquid principle by the addition of a float of known buoyancy or a known weight to the sight tube to bias either the upper or lower diaphragm and thus vary the range of the instrument.

I have thus described three highly practical forms of my invention illustrating how my gage may be used as a portable or fixed instrument for directly reading the specific gravity or a characteristic depending upon the specific gravity of liquid. Other similar forms of my invention should be readily apparent to persons skilled in the art.

Having thus described my invention, what I claim as new and desire to secure by Letters Patent, is:

1. An instrument for measuring the specific gravity of water solutions of relatively heavy and relatively light liquids comprising a transparent sight tube having ribs projecting from the sides thereof, a semi-cylindrical wall spaced from the rear of said sight tube and having its edges joined to said ribs to define a test fluid passage along the rear of said sight tube, heat exchange fins formed on said sight tube and projecting into said passage, bell members of larger diameter than said tube on the ends of said sight tube and communicating therewith, impermeable diaphragms closing said bell members to form a closed chamber, cup shaped extensions formed on the ends of said sight tube and semi-cylindrical wall and forming cavities enclosing said bell members and diaphragms, a suction bulb secured to the upper of said extensions, a base of resilient material secured to the lower of said extensions and defining an inlet recess communicating with said passage along the lower of said diaphragms, an inlet connection to said recess in said base and adapted to be connected to a suction tube, a heavy instrument liquid partially filling said chamber, and a light instrument liquid filling the remainder of said chamber, said instrument liquids being non-miscible, one of said instrument liquids being colored to render the junction of said liquids visible, said ribs having scale indicia thereon adjacent to said sight tube, said heavy liquid having a density greater than the density of the heaviest solution to be tested and said light liquid having a density less than the lightest solution to be tested, said heavy liquid having thermal expansion characteristics similar to the heaviest liquid to be tested and said light liquid having thermal expansion characteristics similar to the lightest liquid to be tested.

2. An instrument for measuring the specific gravity of solutions of relatively heavy and relatively light liquids comprising a transparent sight tube having ribs projecting from the sides thereof, a curved wall spaced from the rear of said sight tube and having its edges joined to said ribs to define a test fluid passage along the rear of said sight tube, heat exchange fins formed on said sight tube and projecting into said passage, bell members of larger diameter than said tube on the ends of said sight tube and communicating therewith, impermeable diaphragms closing said bell members to form a closed chamber, cup shaped extensions formed on the ends of said sight tube and wall and forming cavities enclosing said bell members and diaphragms, a suction bulb secured to the upper of said extensions, a base of resilient material secured to the lower of said extensions and defining an inlet recess communicating with said passage along the lower of said diaphragms, an inlet connection to said recess in said base and adapted to be connected to a suction tube, a heavy instrument liquid partially filling said chamber, and a light instrument liquid filling the remainder of said chamber, said instrument liquids being non-miscible, one of said instrument liquids being colored to render the junction of said liquids visible, said ribs having scale indicia thereon adjacent to said sight tube, said heavy liquid having a density greater than the density of the heaviest solution to be tested and said light liquid having a density less than the lightest solution to be tested, said heavy liquid having thermal expansion characteristics similar to the heaviest liquid to be tested and said light liquid having thermal expansion characteristics similar to the lightest liquid to be tested.

3. An instrument for measuring the specific gravity of solutions of relatively heavy and relatively light liquids comprising a transparent sight tube having ribs projecting from the sides thereof, a curved wall spaced from the rear of said sight tube and having its edges joined to said ribs to define a test fluid passage along the rear of said sight tube, bell members of larger diameter than said tube on the ends of said sight tube and communicating therewith, impermeable diaphragms closing said bell members to form a closed chamber, cup shaped extensions formed on the ends of said sight tube and wall and forming cavities enclosing said bell members and diaphragms a suction bulb secured to the upper of said extensions, a base secured to the lower of said extensions and defining an inlet recess communicating with said passage along the lower of said diaphragms, an inlet connection to said recess in said base, a heavy instrument liquid partially filling said chamber, and a light instrument liquid filling the remainder of said chamber, said instrument liquids being non-miscible, said ribs having scale indicia thereon adjacent to said sight tube, said heavy liquid having a density greater than the density of the heaviest solution to be tested and said light liquid having a density less than the lightest solution to be tested.

4. An instrument for measuring the specific gravity of solutions of relatively heavy and relatively light liquids comprising a transparent sight tube having ribs projecting from the sides thereof, a curved wall spaced from the rear of said sight tube and having its edges joined to said ribs to define a test fluid passage along the rear of said sight tube, bell members of larger diameter than said tube on the ends of said sight tube and communicating therewith, impermeable diaphragms closing said bell members to form a closed chamber, cup shaped extensions formed on the ends of said sight tube and wall and forming cavities enclosing said bell members and diaphragms, a suction bulb secured to the upper of said extensions, a base secured to the lower of said extensions and defining an inlet recess communicating with said passage along the lower of said diaphragms, an inlet connection to said recess in said base, a heavy instrument liquid partially filling said chamber, and a light instrument liquid filling the remainder of said chamber, said instrument liquids being non-miscible, said ribs having scale indicia thereon adjacent to said sight tube.

5. An instrument for measuring the specific gravity of liquids comprising a transparent sight tube, a curved wall spaced from the rear of said sight tube and having its edges connected to said tube to define a test fluid passage along the rear of said sight tube, a heat exchange fin formed on said sight tube and projecting into said passage, bell portions of enlarged diameter on the ends of said sight tube and communicating therewith, impermeable diaphragms closing said bell members to form a closed chamber, cup shaped extensions on the ends of said sight tube and wall and forming cavities enclosing said bell portions and diaphragms, a suction bulb secured to the upper of said extensions, a base secured to the lower of said extensions and defining an inlet chamber communicating with said passage along the lower of said diaphragms, an inlet connection to said recess in said base, a heavy instrument liquid partially filling said chamber, a light instrument liquid filling the remainder of said chamber, said instrument liquids being non-miscible, one of said instrument liquids being colored to render the junction of said liquids visible, said heavy liquid having a density greater than the density of the heaviest liquid to be tested and said light liquid having a density less than the lightest liquid to be tested, and scale indicia alongside of said sight tube calibrated in terms of a characteristic dependant upon the specific gravity of said liquid.

6. An instrument for measuring the specific gravity of a liquid comprising a transparent sight tube, a curved wall spaced from the rear of said sight tube and having its edges connected to said tube to define a test fluid passage along the rear of said sight tube, bell portions of enlarged diameter on the ends of said sight tube and communicating therewith, impermeable diaphragms closing said bell members to form a closed chamber, cup shaped extensions on the ends of said sight tube and wall forming cavities enclosing said bell portions and diaphragms, a base secured to the lower of said extensions and defining an inlet recess communicating with said passage, an inlet connection to said recess in said base, a heavy instrument liquid partially filling said chamber, a light instrument liquid filling the remainder of said chamber, said instrument liquids being non-miscible, and scale indicia alongside of said sight tube calibrated in terms of a characteristic dependant upon the specific gravity of said liquid to be tested.

7. An instrument for measuring the specific gravity of liquids comprising a transparent sight tube, a curved wall spaced from the rear of said sight tube and having its edges connected to said tube to define a test fluid passage along the rear of said sight tube, bell portions of enlarged diameter on the ends of said sight tube and connected therewith, impermeable diaphragms closing said bell members to form a closed chamber, cup shaped extensions on the ends of said sight tube and wall and forming cavities enclosing said bell portions and diaphragms, a base secured to the lower of said extensions and defining an inlet recess communicating with said passage, an inlet connection to said recess in said base, a heavy instrument liquid partially filling said chamber, a light instrument liquid filling the remainder of said chamber, said instrument liquids being non-miscible, and scale indicia alongside of said sight tube calibrated in terms of the specific gravity of said liquid to be tested.

8. An instrument for measuring the specific gravity of a liquid comprising a transparent sight tube, a wall spaced from the rear of said sight tube and having its edges joined to said tube to define a test fluid passage along the rear of said sight tube, bell portions of enlarged diameter on the ends of said sight tube and communicating therewith, impermeable diaphragms closing said bell members to form a closed chamber, walls forming cavities enclosing said bell portions and diaphragms and communicating with said passage, an inlet connection to the lower of said cavities and adapted to be connected to a suction tube, a heavy instrument liquid partially filling said chamber, and a light instrument liquid filling the remainder of said chamber, said instrument liquids being non-miscible, one of said instrument liquids being colored to render the junction of said liquids visible, said heavy liquid having a density greater than the density of the heaviest liquid to be tested, and said light liquid having a density less than the lightest liquid to be tested.

9. An instrument for measuring a characteristic of a liquid dependant upon the specific gravity of the liquid comprising a test chamber having a transparent sight tube with enlarged portions on each end thereof, impermeable diaphragms closing the ends of said enlarged portions, walls forming test liquid chambers surrounding said diaphragms, a conduit for admitting a liquid to be tested to said test liquid chambers, a heavy instrument liquid partially filling said instrument chamber, a light instrument liquid filling the remainder of said instrument chamber, and scale indicia positioned adjacent to said sight tube.

10. An instrument for measuring a characteristic of a liquid dependant upon the specific gravity of the liquid comprising an instrument chamber having a transparent sight tube with enlarged portions on each end thereof, impermeable diaphragms closing the ends of said enlarged portions, walls forming test liquid chambers surrounding said diaphragms, a conduit for admitting test liquid to said test liquid chambers, a heavy instrument fluid partially filling said instrument chamber, a light instrument fluid filling the remainder of said instrument chamber, the rate of thermal expansion of said heavy instrument fluid being approximately equal to the rate of the thermal expansion of the heaviest liquid to be tested, the rate of thermal expansion of said light instrument fluid being approximately equal to the rate of thermal expansion of the lightest liquid to be tested, and scale indicia positioned adjacent to said sight tube.

11. An instrument for measuring a characteristic of a liquid dependant upon the specific gravity of the liquid comprising an instrument chamber having a vertically extending transparent sight tube with enlarged portions disposed at different elevations and communicating with each end thereof, impermeable diaphragms closing the ends of said enlarged portions, walls for retaining a liquid to be tested around said diaphragms, a continuous mass of a heavy instrument fluid partially filling said instrument chamber including the lower portion of said sight tube and the lower of said enlarged portions, and a light instrument fluid filling the remainder of said instrument chamber.

12. An instrument for measuring a characteristic of a fluid dependant upon the specific gravity of the fluid comprising a transparent sight tube having enlarged bell portions on the ends thereof, impermeable diaphragms closing said bell portions to form an instrument chamber, walls forming a test fluid chamber enclosing said bell portions, a suction bulb closing one end of said test fluid chamber, an inlet connection to the other end of said test fluid chamber, a heavy instrument fluid comprising ethylene glycol partially filling said instrument chamber, a light instrument fluid comprising a silicone oil filling the remainder of said instrument chamber, and indicia scales positioned adjacent to a visible wall of said sight tube, part of said scales starting at an intermediate portion of said tube and extending upwardly for heavy test fluids and part of said scales starting at an intermediate portion of said tube and extending downwardly for light test fluids.

13. An instrument for measuring a characteristic of a fluid dependant upon the specific gravity of the fluid comprising a transparent sight tube having enlarged bell portions on the ends thereof, impermeable diaphragms closing said bell portions to form an instrument chamber, walls forming a test fluid chamber enclosing said bell portions, a suction bulb closing one end of said test fluid chamber, an inlet connection to said test fluid chamber, a heavy instrument fluid comprising ethylene glycol partially filling said instrument chamber, a light instrument fluid comprising a silicone oil filling the remainder of said chamber, and indicia scales positioned adjacent to a visible wall of said sight tube, part of said scales starting at an intermediate portion of said tube and extending upwardly for heavy test fluids and part of said scales starting at an intermediate portion of said tube and extending downwardly for light test fluids.

14. An instrument for measuring the freeze point of alcohol and glycol water solutions comprising a transparent sight tube having enlarged bell portions on the ends thereof, impermeable diaphragms closing said bell portions to form an instrument chamber, walls forming a test fluid chamber enclosing said bell portions and having a common wall with said tube, a suction bulb closing one end of said test fluid chamber, a heavy instrument fluid comprising a water solution of ethylene glycol partially filling said instrument chamber, a light instrument fluid comprising a silicone oil filling the remainder of said instrument chamber, and freeze point indicia scales positioned adjacent to a visible wall of said sight tube, said scales starting at an intermediate portion of said tube and extending upwardly for glycol solutions and starting at an intermediate portion of said tube and extending downwardly for alcohol solutions.

15. An instrument for measuring the freeze point of water mixtures comprising a transparent sight tube having enlarged bell portions on the ends thereof, impermeable diaphragms closing said bell portions to form an instrument chamber, walls forming a test fluid chamber enclosing said bell portions and having a common wall with said tube, a suction bulb closing one end of said test fluid chamber, an inlet connection to the other end of said test fluid chamber, a heavy instrument fluid comprising a mixture of ethylene glycol partially filling said instrument chamber, a light instrument fluid comprising a silicone oil filling the remainder of said instrument chamber, and freeze point indicia scales positioned adjacent to a visible wall of said sight tube, part of said scales starting at an intermediate portion of said tube end extending upwardly for mixtures heavier than water and part of said scales starting at an intermediate portion of said tube and extending downwardly for mixtures lighter than water.

16. An instrument for measuring the specific gravity of a liquid comprising a sight tube having enlarged ends closed by impermeable diaphragms to form an instrument chamber, walls forming a test chamber enclosing said diaphragms and having a common wall with said instrument chamber, fluid connections to both ends of said test chamber and adapted to be connected to a source of the liquid to be tested, a heavy instrument fluid partially filling said instrument chamber, and a light instrument fluid filling the remainder of said instrument chamber, said instrument fluids being non-miscible and having specific gravities above and below the range of specific gravity to be tested.

17. An instrument for measuring the specific gravity of a liquid comprising a sight tube having enlarged ends closed by impermeable diaphragms to form an instrument chamber, walls forming a test chamber enclosing said diaphragms and having a common wall with said instrument chamber, a fluid connection to said test chamber and adapted to be connected to a source of the liquid to be tested, a heavy instrument fluid partially filling said instrument chambers, and a light instrument fluid filling the remainder of said instrument chamber, said instrument fluids being non-miscible.

18. An instrument for measuring the specific gravity of a fluid in a tank comprising a pair of bell members having impermeable diaphragms stretched thereacross, said members being positioned in a known vertically spaced position within said tank, a vertically extending sight tube having a smaller cross section than the area of the said bell members and positioned remotely from said tank, piping connecting the upper end of said sight tube to the uppermost of said bell members, other piping connecting the lower end of said sight tube with the lowermost of said bell members, a heavy instrument fluid filling said lower bell member and its associated piping, and a light instrument fluid filling said upper bell member and its associated piping whereby the junction of said instrument fluids occurs within said sight tube, said instrument fluids being colored to render the junction of said fluids visible.

19. An instrument for measuring the specific gravity of a fluid in a tank comprising a pair of bell members having impermeable diaphragms stretched thereacross, said members being positioned in a known vertically spaced position within said tank, a vertically extending sight tube having a smaller cross section than the area of said bell members and positioned remotely from said tank, piping connecting the upper end of said sight tube to the uppermost of said bell members, other piping connecting the lower end of said sight tube with the lowermost of said bell members, a heavy instrument fluid filling said lower bell member and its associated piping, and a light instrument fluid filling said upper bell member and its associated piping whereby the junction of said instrument fluid occurs within said sight tube, said instrument fluids being non-miscible.

20. An instrument for measuring the specific gravity of a fluid in a tank comprising a pair of bell members having impermeable diaphragms stretched thereacross, said members being positioned in a known vertically spaced position within said tank, a vertically extending sight tube having a smaller cross section than the area of said bell members, piping connecting the upper end of said sight tube to the uppermost of said bell members, other piping connecting the lower end of said sight tube with the lowermost of said bell members, a heavy instrument fluid filling said lower bell member and its associated piping, and a light instrument fluid filling said upper bell member and its associated piping whereby the junction of said instrument fluids occurs within said sight tube, said instrument fluids being non-miscible.

21. An instrument for measuring the specific gravity of a fluid in a tank comprising a pair of bell members having impermeable diaphragms stretched thereacross, said members being positioned in a known vertically spaced position within said tank, a vertically extending sight tube having a smaller cross section than the area of said bell members, piping connecting the one upper end of said sight tube to one of said bell members, other piping connecting the other end of said sight tube with the other of said bell members, a heavy instrument fluid filling one of said bell members and its associated piping, and a light instrument fluid filling the other of said bell member and its associated piping whereby the junction of said instrument fluids occurs within said sight tube, said instrument fluids being non-miscible.

22. An instrument for measuring pressure differential between two points in a fluid comprising a chamber having a tube with a vertically extending transparent sight portion with enlarged portions on each end thereof disposed at different levels and communicating with said sight portion, impermeable diaphragms closing the ends of said enlarged portions, a continuous mass of a relatively heavier instrument liquid partially filling said chamber including the lower end of said sight portion and the lower of said enlarged ends, a relatively lighter instrument liquid filling the remainder of said chamber, means for applying the pressure of the fluid from two different points to the faces respectively of the two diaphragms opposite the faces opening to the chamber, and scale indicia significant of the difference in the pressures applied against the diaphragms positioned adjacent to said sight tube.

JOSEPH T. WEBBER.

References Cited in the file of this patent

UNITED STATES PATENTS

| Number | Name | Date |
|---|---|---|
| 2,056,187 | Hay | Oct. 6, 1936 |
| 2,215,660 | Brown et al. | Sept. 24, 1940 |
| 2,354,847 | Woodbridge | Aug. 1, 1944 |
| 2,451,604 | Barnes | Oct. 19, 1948 |